(12) United States Patent
Treffer et al.

(10) Patent No.: US 10,091,935 B2
(45) Date of Patent: Oct. 9, 2018

(54) SWATHBOARD CONTROL WITH WINDROW MERGER ATTACHMENT

(71) Applicant: AGCO Corporation, Hesston, KS (US)

(72) Inventors: Douglas R. Treffer, Newton, KS (US); Brendon C. Nafziger, Canton, KS (US); Mark M. Glade, Hesston, KS (US)

(73) Assignee: AGCO Corporation, Duluth, GA (US)

( * ) Notice: Subject to any disclaimer, the term of this patent is extended or adjusted under 35 U.S.C. 154(b) by 0 days.

(21) Appl. No.: 15/460,421

(22) Filed: Mar. 16, 2017

(65) Prior Publication Data

US 2017/0280627 A1 Oct. 5, 2017

Related U.S. Application Data

(60) Provisional application No. 62/317,967, filed on Apr. 4, 2016.

(51) Int. Cl.

| | | |
|---|---|---|
| *A01D 57/20* | (2006.01) | |
| *A01D 43/077* | (2006.01) | |
| *A01D 82/02* | (2006.01) | |
| *A01D 43/08* | (2006.01) | |
| *A01D 84/00* | (2006.01) | |
| *A01D 34/66* | (2006.01) | |

(Continued)

(52) U.S. Cl.
CPC .......... *A01D 57/20* (2013.01); *A01D 34/667* (2013.01); *A01D 43/077* (2013.01); *A01D 43/086* (2013.01); *A01D 82/02* (2013.01); *A01D 84/00* (2013.01); *A01D 85/001* (2013.01); *A01D 2101/00* (2013.01)

(58) Field of Classification Search
CPC ........ A01D 43/04; A01D 57/16; A01D 57/20; A01D 57/26; A01D 57/28; A01D 57/30; A01D 43/077; A01D 43/10; A01D 34/667; A01D 34/668; A01D 84/00
See application file for complete search history.

(56) References Cited

U.S. PATENT DOCUMENTS 5,930,988 A * 8/1999 Hanson ................. A01D 57/00
56/16.4 A
6,415,590 B1 7/2002 Lohrentz
(Continued)

FOREIGN PATENT DOCUMENTS

GB 2233870 A 1/1991

OTHER PUBLICATIONS

UK Intellectual Property Office, International Search Report for related UK Application No. GB1607220.9, dated Oct. 24, 2016.

*Primary Examiner* — Alicia Torres (57) ABSTRACT

A windrower has a crop merger attachment with a conveyor configured to receive crop material from a crop conditioning mechanism and direct the crop material to a side of the windrower, the crop merger attachment being mounted for adjusting movement between a lowered and a raised position. The windrower has a swathboard mounted for adjusting movement between a fully raised position in which the crop material passes beneath the swathboard for engagement with the merger attachment and a lowered position in which the crop material down to the ground under the merger attachment under the windrower. A control system automatically adjusts movement of the swathboard when movement of the merger attachment is detected.

3 Claims, 4 Drawing Sheets

(51) Int. Cl.
*A01D 85/00* (2006.01)
*A01D 101/00* (2006.01)

(56) References Cited

U.S. PATENT DOCUMENTS

| | | | |
|---|---|---|---|
| 6,658,828 B2* | 12/2003 | Franet | A01D 34/667 56/7 |
| 7,823,372 B1* | 11/2010 | Kraus | A01D 57/20 56/192 |
| 9,769,986 B2* | 9/2017 | Rotole | A01D 41/141 |
| 2005/0120696 A1 | 6/2005 | Lohrentz et al. | |
| 2009/0313964 A1 | 12/2009 | McLean et al. | |

* cited by examiner

SWATHBOARD CONTROL WITH WINDROW MERGER ATTACHMENT

CROSS REFERENCE TO RELATED APPLICATION

This application claims the benefit of U.S. Provisional Application No. 62/317,967 filed Apr. 4, 2016, which is hereby incorporated by reference in its entirety.

BACKGROUND OF THE INVENTION

Field of Invention

The present disclosure is generally related to agricultural equipment and, more particularly, is related to crop discharge mechanisms of a windrower.

Description of Related Art

Windrowers have been used in farming operations to cut and condition hay and other crops and to selectively deposit the crop on the ground in either a windrow or a swath. Windrowers are often provided with a swathboard located behind the conditioning mechanism of the machine generally in the path of travel of the stream of conditioned materials as they are discharged rearwardly through the air by the conditioning mechanism. When the swathboard is positioned in a lowered position, the stream of crop materials will engage the swathboard and be directed down to the ground under the machine.

Windrowers may also be provided with a merger attachment that connects to the underside of the windrower that combines up to three windrows into a single large windrow as the windrower makes successive passes through the field. The merger attachment typically has a conveyor driven by a hydraulic motor that throws the crop to the right side of the machine. The merger attachment can be lowered to its operating position or raised with a hydraulic cylinder to a position where the crop can bypass the merger attachment.

In one method of combining three windrows into one, the first windrow is cut and dropped directly under the windrower while the merger attachment is raised and not engaged. During this first pass, it is best if the swathboard is at the minimum height defined by the operator. The next path after a right-hand headland turn will be able to throw the crop back onto the first windrow using the merger attachment. During any pass where crop is being moved with the merger attachment, the swathboard needs to be in the highest position, otherwise the crop does not always make it onto the merger deck, and either goes under the merger or gets pushed and balled up by the merger. Then after a second right-hand headland turn skipping over the first pass, the merger will then set the third windrow on top of the previous combined windrows.

If the user forgets to raise the swathboard after he has lowered the merger attachment, the crop may not make it onto the merger conveyor and either goes directly under the machine when the operator is expecting to combine the windrows, or the crop gets pushed by the merger creating a large ball or plug. Also, if an operator forgets to lower the swathboard when not using the merger attachment for the first pass, a less than ideal windrow may be formed.

BRIEF SUMMARY OF THE INVENTION

Briefly stated, one aspect of the invention is directed to a windrower having mechanism for conditioning crop material severed from the field and for discharging the conditioned material in a rearwardly directed stream as the windrower moves across the field. The windrower includes a header having a crop cutting and a crop conditioning mechanism. The windrower has a crop merger attachment with a conveyor configured to receive crop material from the crop conditioning mechanism and direct the crop material to a side of the windrower to form a windrow on the ground to the side of the windrower. The crop merger attachment is mounted for adjusting movement between an operational, lowered position in which the crop material is directed onto the conveyor and a non-operational, raised position in which the stream of crop material is directed away from the crop merger apparatus. The windrower has a transverse swathboard between the crop conditioning mechanism and the crop merger attachment along substantially the full width of the conditioning mechanism. The swathboard is mounted for adjusting movement between a fully raised position in which the stream of crop material passes beneath the swathboard for engagement with the merger attachment to form a windrow on the ground to the side of the windrower and a fully lowered position in which the swathboard diverts the stream of crop material down to the ground under the merger attachment under the windrower. The windrower has a position sensor configured to detect movement of the crop merger attachment between the lowered and raised positions of the crop merger attachment. The windrower has a control system operably coupled with the position sensor and the swathboard for automatically effecting said adjusting movement of the swathboard when movement of the merger attachment is detected. In one embodiment, the windrower has an actuator configured to move the swathboard between the raised position and the lowered position and the control system has actuable device controls for controlling said actuator.

Another aspect of the invention is a method of operating a windrower with a header coupled thereto. The method includes mowing crop with the header, adjusting the height of the merger attachment to a lowered position, automatically adjusting the position of the swathboard to a raised position in response to lowering the merger attachment, adjusting the height of the merger attachment to a raised position, and automatically adjusting the position of the swathboard to a lowered position in response to raising the merger attachment. Accordingly, the method of automatically adjusting the swathboard height to the merger position provides that when the merger attachment is lowered into the position switch range, the swathboard will be raised and when the merger is raised above position switch range, the swathboard will be lowered.

This summary is provided to introduce concepts in simplified form that are further described below in the Description of Preferred Embodiments. This summary is not intended to identify key features or essential features of the disclosed or claimed subject matter and is not intended to describe each disclosed embodiment or every implementation of the disclosed or claimed subject matter. Specifically, features disclosed herein with respect to one embodiment may be equally applicable to another. Further, this summary is not intended to be used as an aid in determining the scope of the claimed subject matter. Many other novel advantages, features, and relationships will become apparent as this description proceeds. The figures and the description that follow more particularly exemplify illustrative embodiment.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DESCRIPTION OF PREFERRED EMBODIMENTS

The following detailed description illustrates the invention by way of example and not by way of limitation. This description will clearly enable one skilled in the art to make and use the invention, and describes several embodiments, adaptations, variations, alternatives and uses of the invention, including what we presently believe is the best mode of carrying out the invention. Additionally, it is to be understood that the invention is not limited in its application to the details of construction and the arrangements of components set forth in the following description or illustrated in the drawings. The invention is capable of other embodiments and of being practiced or being carried out in various ways. Also, it is to be understood that the phraseology and terminology used herein is for the purpose of description and should not be regarded as limiting.

Figure 1:
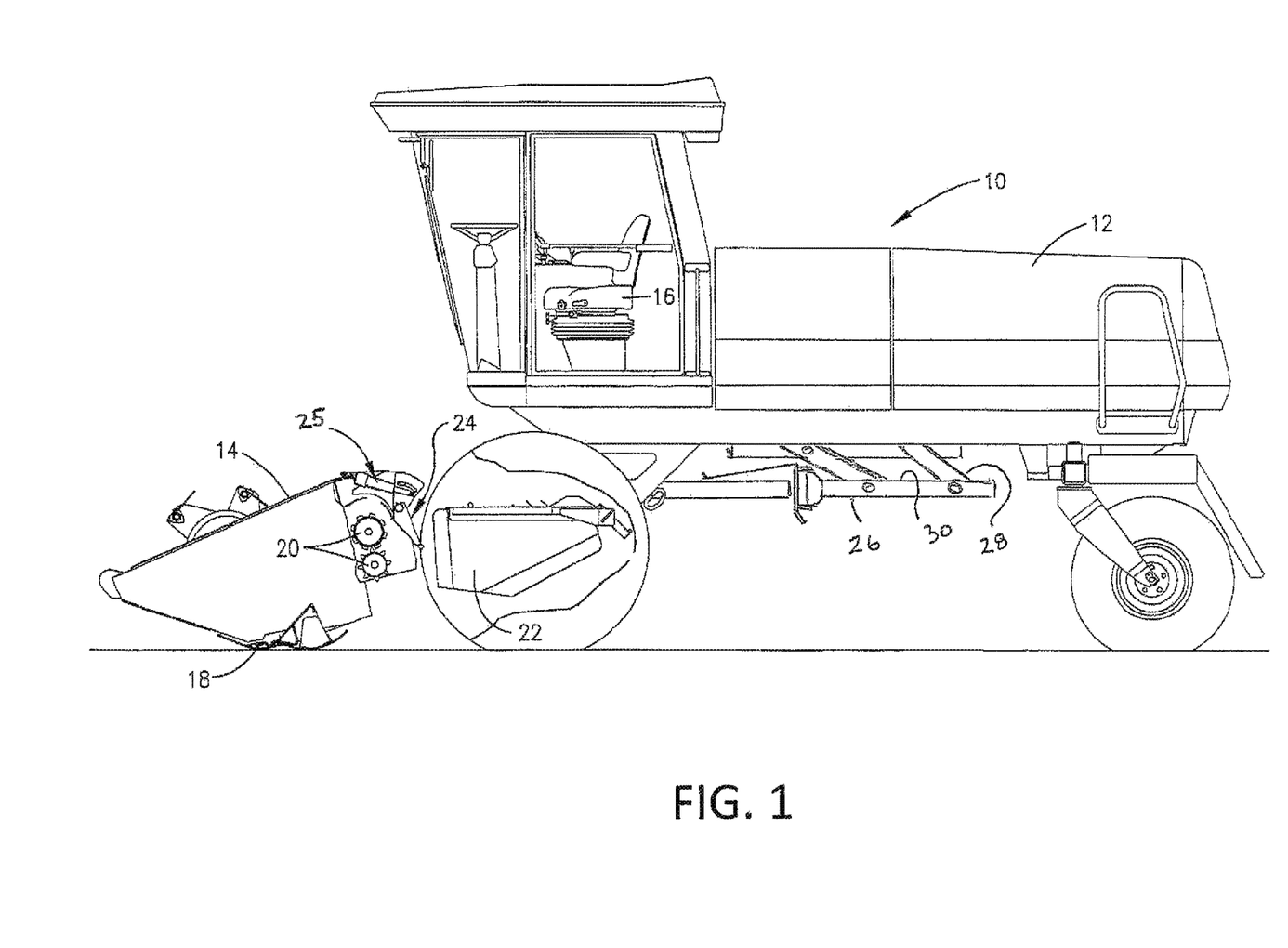
FIG. 1 is schematic side elevational view of a self-propelled windrower embodying the principles of the present invention and capable of carrying out the novel method.

FIG. 1 illustrates the concepts of the present invention in connection with a self-propelled mower-conditioner or windrower 10. However, it will be appreciated that the scope of this invention is not limited to self-propelled machines. The concepts are equally applicable to pull-type machines, even though for the sake of illustration the invention has been disclosed in connection with a self-propelled machine. Furthermore, although harvesters which mow, condition and windrow crop materials are sometimes interchangeably referred to as mower-conditioners or windrowers, for the sake of simplicity, such machines will be referred to herein as "windrowers."

The windrower 10 broadly comprises a self-propelled tractor 12 and a harvesting header 14 attached to the front of the tractor 12. The operator drives the harvester 10 from the operator station or tractor seat 16, and from which he also operates the various components of the header 14. The header 14 may be detachably coupled to the tractor 12, and may be embodied as one of a variety of widths as is known. The header 14 includes a cutter 18 for severing standing crops as the machine moves through the field, conditioning mechanism in the form of a pair of conditioner rolls 20, and may include a pair of rearwardly converging windrow forming shields 22 behind the conditioner rolls 20. A swathboard 24 is located between the conditioner rolls 20 and the forming shields 22 and is moveable between raised and lowered positions to selectively direct the crop. As the features and function of the structural assembly of the tractor 12 and header 14 are well-known in the agricultural equipment industry, further discussion of the same is omitted here for brevity.

In relevant part, the conditioner rolls 20 have the characteristic of projecting a stream of conditioned materials rearwardly therefrom and toward the swathboard 24 as the crop materials issue from the rolls 20. A remotely operated actuator 25 in the form of an electromechanical device is operably connected to the swathboard 24 to change the position of the swathboard. In one known embodiment, actuator 25 contains a small, reversible electric motor which drives a worm gear and the swathboard 24 is fixed to a transversely extending tube. A crank is fixed to the tube and projects upwardly therefrom for rotating the crank and thus the swathboard between the fully raised position of FIG. 3 and the fully lowered position of FIG. 2. However, other the actuator 25 may also use a hydraulic cylinder or other means to move the swathboard 24 between the raised and lowered positions using sound engineering judgment. With the swathboard 24 fully lowered as in the schematic diagram of FIG. 2, the stream of crop material issuing from the conditioner rolls 20 impinges against the swathboard 24 and is directed to the ground. On the other hand, when the swathboard 24 is fully raised as in the schematic diagram of FIG. 3, the crop stream completely misses the swathboard 24.

Figure 2:
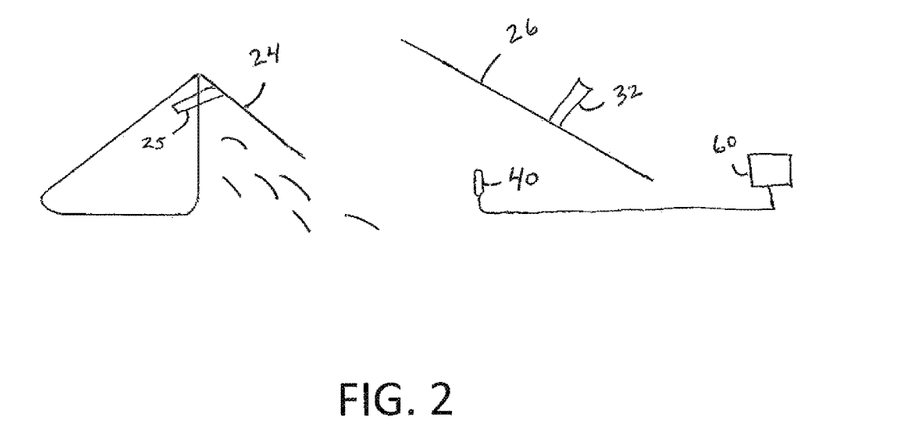
FIG. 2 is schematic view of the windrower showing the swathboard in a lowered position and the merger attachment in a raised position.
Figure 3:
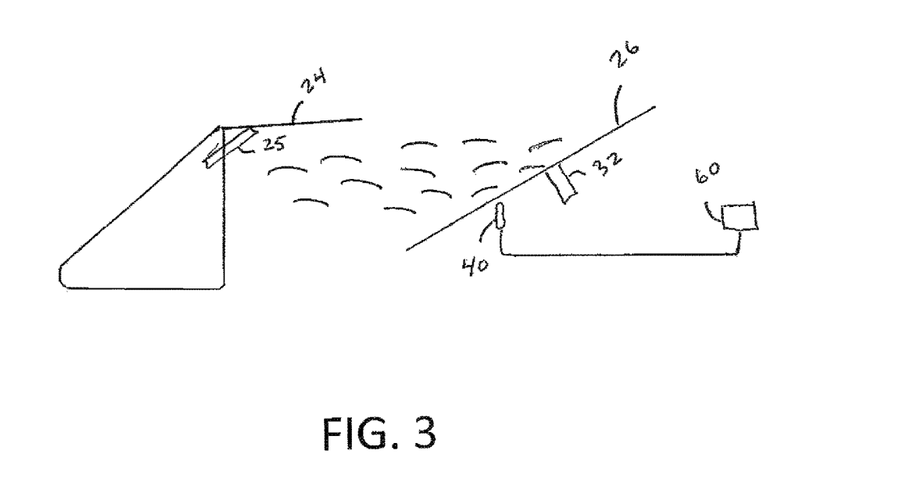
FIG. 3 is schematic view of the windrower showing the swathboard in a raised position and the merger attachment in a lowered position.

The windrower 10 has a merger attachment 26 comprising a frame 28 coupled to the windrower. Moveable circuitously within the frame 28 is a conveying medium 30 that receives the mowed crop discharged from the header 14. In one embodiment, the conveying medium 30 comprises an endless, elastomeric belt, though in some embodiments, additional belts and/or other materials or types of conveying mediums (e.g., slats, chains, etc.) may be used. As would be understood by one skilled in the art, the frame 28 comprises plural rollers (not shown) over which the conveying medium 30 circuitously travels. The merger attachment 26 is positionable between a raised position as shown in FIGS. 1 and 2 in which the conveyor 30 is positioned above and out of the way of the stream of crop material coming from the conditioner rolls 20 and a lowered, operational position in which the crop material coming from the conditioner rolls 20 lands on the conveyor 30. As illustrated in FIG. 3, the merger attachment 26 is in the lowered position such that crop material is directed rearward passed the swathboard 24 and onto the conveyor 30 of the merger attachment 25. A conventional actuator 32 is used to raise and lower the merger attachment 30 as would be understood by one skilled in the art.

In one example windrower operation, during one pass across the field by the windrower 10, the swathboard is oriented in the lowered position and the merger attachment 26 is oriented in the raised position. With the merger attachment 26 in the raised position, the windrower 10 discharges mowed crop onto the field in between the front wheels of the windrower 10. Upon reaching a point where the operator of the windrower 10 seeks to turn the windrower 10 around, the operator activates (or in some embodiments, the activation is automatic based on the detected coordinate position and/or heading) the merger attachment 26. The merger attachment 26, is lowered (FIG. 3) in known manner using the actuator 32.

According to the invention, the windrower 10 is operated such that the height of the swathboard 24 is automatically adjusted based on the position of the merger attachment 26. As shown in FIGS. 2 and 3, a position sensor 40 is mounted so as to detect the height position of the merger attachment 26. Desirably, the automatic adjustment is a selectable feature available to the operator from the operator station 16 of the windrower 10. When the merger attachment 26 is lowered into a range detectable by the position sensor 40, the swathboard 24 will be automatically raised to its raised position. When the merger attachment 26 is raised above a range detectable by the position sensor 40, the swathboard 24 will be lowered to its lowered position. In one embodiment, each time the auto swathboard adjust is triggered, it will drive the actuator 25 for a set amount of time that it would take the actuator to run full stroke of the actuator.

Figure 4:
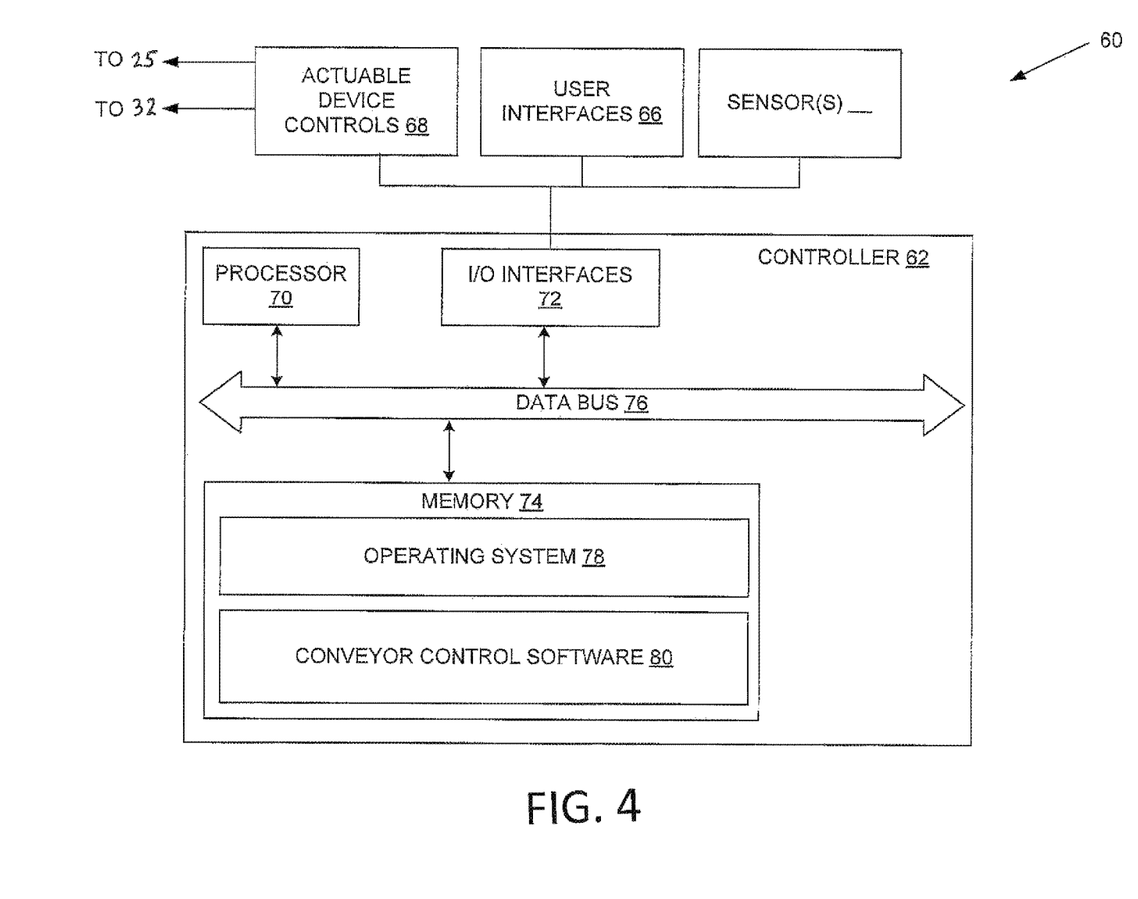
FIG. 4 is a block diagram that illustrates an embodiment of an example control system for the windrower.

Having described the overall structure and functionality of an embodiment of a merger attachment 26, attention is now directed to FIG. 4 (with continued reference to FIGS. 1-3), which shows an embodiment of an example control system 60 that may be used to control operations of the swathboard 24 and the merger attachment 26. In one embodiment, the control system 60 comprises a controller 62 (e.g., an electronic control unit or ECU) coupled to one or more position sensor 40, user interfaces 66, and actuable device controls 68. In some embodiments, additional controllers may be used. In one embodiment, the actuable device controls 68 (or equivalently, actuators) are each respectively coupled to one or more actuable devices, such as actuators 25 and 32. In some embodiments, the actuable device controls 68 may be embodied as one or more devices that are more rudimentary in operation, such as switches (e.g., relays, and/or contactors). Operation of the actuators 25 and 32 may be based on any one or combination of hydraulic, electric, mechanical, magnetic, pneumatic motive forces. In some embodiments, one or more of the position sensors 40 may be located proximal to merger attachment 26. One having ordinary skill in the art should appreciate in the context of the present disclosure that the example controller 62 is merely illustrative, and that some embodiments of controllers may comprise fewer or additional components, and/or some of the functionality associated with the various components depicted in FIG. 4 may be combined, or further distributed among additional modules or controllers, in some embodiments. Further, it should be appreciated that, though described in the context of residing in a single controller 62, functionality of the controller 62 may be distributed among a plurality of controllers in some embodiments, and in some embodiments, one or more of the functionality of the controller 62 may be achieved remote from the windrower 10 (e.g., FIG. 1, where the windrower 10 has telecommunications and/or internet connectivity functionality). The controller 62 is depicted in this example as a computer system, but may be embodied as a programmable logic controller (PLC), field programmable gate array (FPGA), application specific integrated circuit (ASIC), among other devices. It should be appreciated that certain well-known components of computer systems are omitted here to avoid obfuscating relevant features of the controller 62. In one embodiment, the controller 62 comprises one or more processors, such as processor 70, input/output (I/O) interface(s) 72, and memory 74, all coupled to one or more data busses, such as data bus 76. The memory 74 may include any one or a combination of volatile memory elements (e.g., random-access memory RAM, such as DRAM, and SRAM, etc.) and nonvolatile memory elements (e.g., ROM, hard drive, tape, CDROM, etc.). The memory 74 may store a native operating system, one or more native applications, emulation systems, or emulated applications for any of a variety of operating systems and/or emulated hardware platforms, emulated operating systems, etc.

In the embodiment depicted in FIG. 4, the memory 74 comprises an operating system 78 and conveyor control software 80. It should be appreciated that in some embodiments, additional or fewer software modules (e.g., combined functionality) may be deployed in the memory 74 or additional memory (or in different devices). In some embodiments, a separate storage device may be coupled to the data bus 76, such as a persistent memory (e.g., optical, magnetic, and/or semiconductor memory and associated drives). The storage device may be a removable device, such as a memory stick or disc.

In one embodiment, the conveyor control software 80 is executed by the processor 70 to receive user input at the user interfaces 66 (e.g., one or a combination of console button, switch, knob, hydro handle or joystick, scroll wheel, display screen with selectable icon displayed on the screen that is manipulated by a mouse or joystick, display screen embodied with selectable icons on a touch-type screen, microphone on a headset or on the console, etc.), match or associate (e.g., via look-up table or in some embodiments via programmed switch position activation) the input with a corresponding swathboard function (e.g., automatic adjustment of the swathboard 24 between the raised and lowered positions), and actuate one or more actuable device controls 68, which in turn causes the actuator 25, among possibly others to be activated accordingly. As to the actuable device controls 68, where the actuator 25 is embodied as a hydraulic cylinder, in one embodiment, the actuable device controls 68 may include a control valve that comprises an actuator (e.g., solenoid) that receives a control signal from the controller 62 (or plural controllers) and responsively, actuates the control valve in known manner to enable a change in flow through the control valve and to the ports of ae hydraulic cylinder. In some embodiments, the actuable device controls 68 may be embodied as electrical, pneumatic, mechanical actuators, in addition to or in lieu of hydraulic actuation, or in some embodiments, as switches (e.g., relays, contactors, etc.). In some embodiments, one or more of the actuable devices may be omitted in favor of manual (e.g., mechanical) levers or controls.

Note that the input at the user interfaces 66 may correspond to the operator engaging the merger attachment 26, including well-known functions of swiveling the frame 28 into a lowered, operable or engaged position, positioning the frame 28 up or down, engagement to initiate movement of the conveying medium 30 and speed adjustment of the conveying medium 30). In some embodiments, the operator input may include entry of the width of the header and/or crop type or field conditions. In some embodiments, the position sensor 40 (e.g., contact type or non-contact type sensors) may provide the conveyor control software 80 with feedback (e.g., signals via I/O interfaces 72) regarding certain functions of the windrower 10, such as the position of the merger attachment 26. In some embodiments, other sensor input may include the detected angular position of the wheels (e.g., detecting whether a turn for approaching a subsequent pass of the field is occurring to automatically lower (or raise) the merger attachment 26), or positioning and/or heading information (e.g., via global navigation satellite systems (GNSS), radar, laser, video, etc.) signal input to detect when the windrower 10 has reached an end of field pass to enable the raising or lowering of the merger attachment 26. In some embodiments, input entered by an operator may instead be received via a sensor (e.g., width of the header may be detected by a camera or video device).

The user interfaces 66 may comprise a display screen coupled to the controller 62 with selectable icons, a hydro handle or joystick with selectable buttons or switches, a console with switches, button, knobs, scroll wheel, a microphone, etc., with corresponding signals from operator input received at the user interfaces 66 delivered via the I/O interfaces 72 to the conveyor control software 80 executing on the processor 70. A lookup table (or other form of data structure in some embodiments) may be stored in memory 74 when used to translate the input (e.g., whether via user interfaces input or sensor input) to a corresponding function (e.g., automatic adjustment of the swathboard 24). The output from the conveyor control software 80 is provided to the actuable device controls 68, which in turn causes the actuable devices (e.g., 25 and 32) to effectuate movement of structural components of or associated with the merger attachment 26.

Execution of the conveyor control software 80 may be implemented by the processor 70 under the management and/or control of the operating system 78. For instance, as is known, the source statements that embody the method steps or algorithms of the conveyor control software 80 may be translated by one or more compilers of the operating system 78 to assembly language and then further translated to a corresponding machine code that the processor 70 executes to achieve the functionality of the conveyor control software 80. Variations of this execution process are known, depending on the programming language of the software. For instance, if Java-based, the compiled output may comprise bytecode that may be run on any computer system platform for which a Java virtual machine or bytecode interpreter is provided to convert the bytecode into instructions that can be executed by the processor 70. Also, register transfer language (or other hardware description language) may be used to translate source code to assembly language, which the one or more operating system compilers translate to executable machine code. In some embodiments, the operating system 78 may be omitted and a more rudimentary manner of control implemented. The processor 70 may be embodied as a custom-made or commercially available processor, a central processing unit (CPU) or an auxiliary processor among several processors, a semiconductor based microprocessor (in the form of a microchip), a macroprocessor, one or more application specific integrated circuits (ASICs), a plurality of suitably configured digital logic gates, and/or other well-known electrical configurations comprising discrete elements both individually and in various combinations to coordinate the overall operation of the controller 62.

The I/O interfaces 72 provide one or more interfaces to one or more devices, such as the actuable device controls 68, the user interfaces 66, the position sensor 40, among other devices that are coupled directly or indirectly (e.g., over a bus network, such as a CAN network, including one operating according to ISO-bus) to the controller 62. The I/O interfaces 72 may also comprise functionality to connect to other networks. For instance, the I/O interfaces 72 may include a network interface that enables remote or wireless communications, such as via well-known telemetry functionality, Blue-tooth communications, near-field, among other electromagnetic spectrum communications.

When certain embodiments of the controller 62 are implemented at least in part with software (including firmware), as depicted in FIG. 4, it should be noted that the software can be stored on a variety of non-transitory computer-readable medium for use by, or in connection with, a variety of computer-related systems or methods. In the context of this document, a computer-readable medium may comprise an electronic, magnetic, optical, or other physical device or apparatus that may contain or store a computer program (e.g., executable code or instructions) for use by or in connection with a computer-related system or method. The software may be embedded in a variety of computer-readable mediums for use by, or in connection with, an instruction execution system, apparatus, or device, such as a computer-based system, processor-containing system, or other system that can fetch the instructions from the instruction execution system, apparatus, or device and execute the instructions.

When certain embodiments of the controller 62 are implemented at least in part with hardware, such functionality may be implemented with any or a combination of the following technologies, which are all well-known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Figure 5:
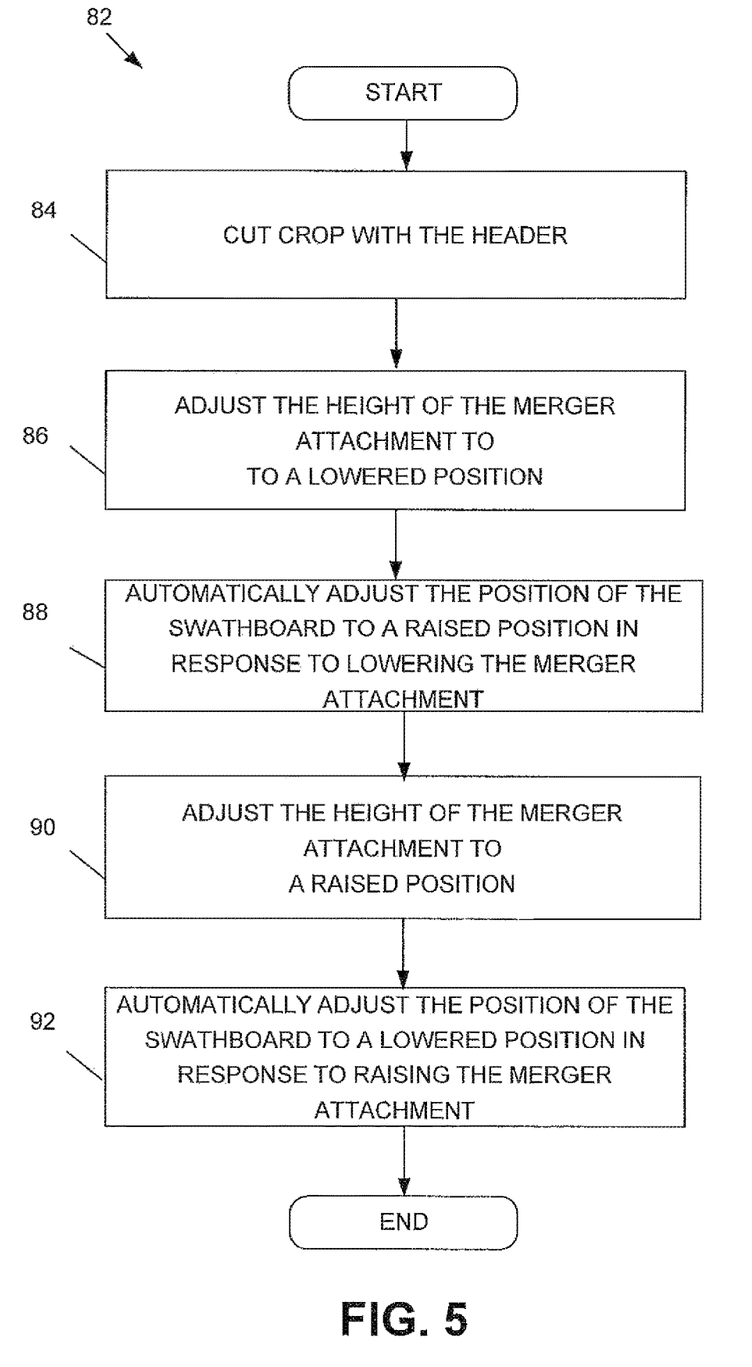
FIG. 5 is a flow diagram that illustrates an embodiment of an example method of operating a windrower by automatically adjusting the position of the swathboard based on adjustment of the position of the merger attachment.

Having described some example embodiments of the swathboard 24 and merger attachment 26, it should be appreciated in view of the present disclosure that one embodiment of a method of operating a windrower, the method depicted in FIG. 5 and denoted as method 82, comprises mowing crop with the header (84); adjusting the height of the merger attachment 26 to a lowered position (86); automatically adjusting the position of the swathboard 24 to a raised position in response to lowering the merger attachment 26 (88); adjusting the height of the merger attachment 26 to a raised position (90); automatically adjusting the position of the swathboard 24 to a lowered position in response to raising the merger attachment 26 (92).

Any process descriptions or blocks in flow charts should be understood as representing steps in the process, and alternate implementations are included within the scope of the embodiments in which functions may be executed out of order from that shown or discussed, including substantially concurrently or in reverse order, depending on the functionality involved, as would be understood by those reasonably skilled in the art of the present disclosure.

It should be emphasized that the above-described embodiments of the present disclosure are merely possible examples of implementations, merely set forth for a clear understanding of the principles of the disclosure. Many variations and modifications may be made to the above-described embodiment(s) of the disclosure without departing substantially from the spirit and principles of the disclosure. All such modifications and variations are intended to be included herein within the scope of this disclosure and protected by the following claims.

At least the following is claimed:

1. A windrower having a mechanism for conditioning crop material severed from the field and for discharging the crop material in a rearwardly directed stream as the windrower moves across the field, the windrower comprising:
    a header comprising a crop cutting mechanism and the crop conditioning mechanism;
    a crop merger attachment comprising a conveyor configured to receive crop material from the crop conditioning mechanism and direct the crop material to a side of the windrower to form a windrow on the ground to the side of the windrower, the crop merger attachment being mounted for adjusting movement between an operational, lowered position in which the crop material is directed onto the conveyor and a non-operational, raised position in which the stream of crop material is directed away from the crop merger attachment;

a transverse swathboard between said crop conditioning mechanism and the crop merger attachment along substantially the full width of the conditioning mechanism, said swathboard being mounted for adjusting movement between a fully raised position in which the stream of crop material passes beneath the swathboard for engagement with the merger attachment to form a windrow on the ground to the side of the windrower and a fully lowered position in which the swathboard diverts the stream of crop material down to the ground under the merger attachment under the windrower;

a position sensor configured to detect movement of the crop merger attachment between the lowered and raised positions of the crop merger attachment; and a control system operably coupled with the position sensor and the swathboard for automatically effecting said adjusting movement of the swathboard when movement of the merger attachment is detected.

2. The windrower of claim 1 further comprising an actuator configured to move the swathboard between the raised position and the lowered position, the control system comprising actuable device controls for controlling said actuator.

3. A method of operating a windrower with a header coupled thereto, the method comprising:

mowing crop with the header;

adjusting a height of a merger attachment to a lowered position;

automatically adjusting a position of a swathboard to a raised position in response to lowering the merger attachment;

adjusting the height of the merger attachment to a raised position; and automatically adjusting the position of the swathboard to a lowered position in response to raising the merger attachment.

* * * * *